UNITED STATES PATENT OFFICE.

EDWARD J. PUGH, OF TRENTON, MICHIGAN, ASSIGNOR TO PENNSYLVANIA SALT MANUFACTURING COMPANY, OF WYANDOTTE, MICHIGAN, A CORPORATION OF PENNSYLVANIA.

PROCESS OF MAKING BASIC ZIRCONIUM SULFATE.

1,376,161.      Specification of Letters Patent.      Patented Apr. 26, 1921.

No Drawing.      Application filed January 30, 1919. Serial No. 274,123.

*To all whom it may concern:*

Be it known that I, EDWARD J. PUGH, a citizen of the United States, residing at Trenton, Wayne county, Michigan, have invented a new and useful Process of Making Basic Zirconium Sulfate, of which the following is a full, clear, and exact description.

The present invention relates to a process of making basic zirconium sulfate and more particularly, to the process of manufacturing the basic zirconium sulfate from the zirconium bearing ores.

The process of this invention is simple and comparatively inexpensive and yields a basic zirconium sulfate from which a substantially pure zirconium oxid may be obtained.

The zirconium bearing ores commonly employed are zirkite, which contains a zirconium content equivalent to approximately 80% $ZrO_2$, most of the zirconium being in the oxid form and the remaining part combined with silica. This ore generally contains other impurities such as iron, and titanium, of about one to four per cent. Another common zirconium bearing ore employed is zircon, which is essentially zirconium silicate, generally mixed with iron, titanium and other impurities.

The present process has been employed in manufacturing basic zirconium sulfate from these ores but is not limited thereto as it may be employed with other zirconium bearing ores.

The ore is ground preferably to about 200 mesh per inch and is mixed with pulverized carbonaceous material such as charcoal, graphite or coke. The amount of carbonaceous material may be varied within wide limits but it is preferred to use about equal weights of ore to the carbonaceous material. The carbonaceous material acts as a deoxidizer. The mixture of ore and carbonaceous material is maintained at a temperature of from 700° to 1000° centigrade and a stream of dry chlorin gas is passed over the heated ore. The temperature may be varied somewhat, depending upon the character of the ore. In general a higher temperature is required for an ore with a high silica content.

The chlorin combines with the ore to form zirconium tetrachlorid, which sublimes and is led away from the heat chamber and condensed. The zirconium tetrachlorid is substantially free from silica. Substantially all of the iron content of the ore is sublimed as ferric chlorid. Ferric chlorid sublimes at a lower temperature than zirconium tetrachlorid and, if desired, partial separation of the iron and zirconium may be obtained by separating the first part of the sublimate, or by keeping the temperature lower during the first part of the chlorination, or by re-sublimation.

In general, however, it is found that the entire sublimate of the zirconium tetrachlorid with the iron impurities may be used for further treatment.

The sublimed zirconium tetrachlorid is next dissolved in sufficient water so that the resulting solution will contain approximately 33 grams of zirconium oxid per liter. The zirconium tetrachlorid and water react to form zirconium oxychlorid ($ZrOCl_2$) and free hydrochloric acid. Sufficient free hydrochloric acid is produced to hold the iron and titanium impurities in solution during the subsequent step of precipitating the zirconium with sulfuric acid.

If an exceptionally pure basic sulfate of zirconium is desired, it is advisable to add only the theoretical amount of water necessary to convert the tetrachlorid to an oxychlorid. With this amount of water, the solid tetrachlorid is converted into oxychlorid crystals. Then the crystals are washed with strong hydrochloric acid which removes the iron and other impurities and then the crystals are dissolved in water. The solution of oxychlorid obtained by the direct solution of the tetrachlorid by adding preferably enough water to form a solution having about 33 grams of $ZrO_2$ per liter, is, however, pure enough for most purposes, yielding a basic zirconium sulfate which may be converted to an oxid having well over 99% of pure zirconium oxid.

To the cold solution of oxychlorid containing approximately 33 grams of $ZrO_2$ per liter, is added sulfuric acid of approximately the proportions of $3H_2SO_4$ to $5ZrO_2$, and the solution is heated to a temperature which may vary from about 80° to 100° centigrade. So long as the solution remains cold, little or no precipitate is formed, but upon heating a white crystalline precipitate having approximately the composition $5ZrO_2.3SO_3.13H_2O$ is formed. The zirconium is precipitated as the basic sulfate having approximately the above formula, and free from iron, titanium and silicon. This basic zirconium sulfate may be readily converted into zirconium oxid by any of the well known methods, such as heating or precipitating by alkalis.

As a specific example, a quantity of ore having a content of about 100 grams zirconium oxid is mixed with about equal weight of carbon, heated in a tube and a stream of dry chlorin gas conducted over the heated mass. The zirconium is sublimated as zirconium tetrachlorid, and dissolved in about 3 liters of water. The solution is filtered and to it is added about 48 grams of strong sulfuric acid. On heating the solution, the precipitate of basic zirconium sulfate above described, is obtained.

I do not desire to limit myself to the particular proportions and temperatures which I have herein given as these may be varied within the spirit and scope of the invention as defined in the following claims.

I claim:

1. The process of manufacturing a basic sulfate of zirconium from zirconium bearing ore, comprising the steps of passing chlorin gas over the heated ore mixed with a carbonaceous material and subliming the zirconium content as zirconium tetrachlorid, adding water to the sublimate to convert the zirconium tetrachlorid into a zirconium oxychlorid solution, adding sulfuric acid to the solution in approximately the proportions of $3H_2SO_4$ to $5ZrO_2$ and heating the solution whereby a precipitate of a basic sulfate of zirconium is obtained; substantially as described.

2. The process of manufacturing a basic sulfate of zirconium from zirconium bearing ore, comprising the steps of pulverizing the ore, mixing the ore with pulverized carbonaceous material, heating the mixture and passing chlorin gas over the hot mixture, collecting the sublimate thus produced, adding water to the sublimate to form a zirconium containing solution and adding sulfuric acid to this solution so as to obtain a precipitate of a basic zirconium sulfate; substantially as described.

3. The process of manufacturing a basic sulfate of zirconium from zirconium bearing ore, comprising the steps of passing chlorin gas over the heated ore and thereby subliming the zirconium content from the ore, adding water to the sublimate and thereby bringing the zirconium content into solution, and adding sulfuric acid to the solution and thereby precipitating the zirconium content as a basic zirconium sulfate; substantially as described.

4. The process of manufacturing a basic sulfate of zirconium from zirconium bearing ore, comprising the steps of heating the ore and passing a stream of chlorin gas over the hot ore to convert the zirconium content into zirconium tetrachlorid which is sublimed from the ore, adding water to the sublimate to convert the zirconium tetrachlorid into zirconium oxychlorid, and then adding sulfuric acid in approximately the proportion of $3H_2SO_4$ to $5ZrO_2$ and heating the solution whereby a basic sulfate of zirconium is precipitated; substantially as described.

In testimony whereof, I have hereunto set my hand.

EDWARD J. PUGH.